(12) United States Patent
Scott et al.

(10) Patent No.: US 11,568,679 B2
(45) Date of Patent: *Jan. 31, 2023

(54) OBTAINING ARTIST IMAGERY FROM VIDEO CONTENT USING FACIAL RECOGNITION

(71) Applicant: Gracenote, Inc., Emeryville, CA (US)

(72) Inventors: Jeffrey Scott, Oakland, CA (US); Aneesh Vartakavi, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/340,640

(22) Filed: Jun. 7, 2021

(65) Prior Publication Data

US 2021/0295023 A1 Sep. 23, 2021

Related U.S. Application Data

(63) Continuation of application No. 16/720,200, filed on Dec. 19, 2019, now Pat. No. 11,062,127.
(Continued)

(51) Int. Cl.
*G06V 40/16* (2022.01)
*G06T 7/73* (2017.01)
*G06F 16/783* (2019.01)

(52) U.S. Cl.
CPC .......... *G06V 40/173* (2022.01); *G06F 16/784* (2019.01); *G06T 7/75* (2017.01); *G06V 40/171* (2022.01)

(58) Field of Classification Search
CPC .... G06V 40/173; G06V 40/171; G06V 20/46; G06V 40/172; G06F 16/784; G06T 7/75
(Continued)

(56) References Cited

U.S. PATENT DOCUMENTS

2003/0198368 A1* 10/2003 Kee .................. G06V 40/16
382/117
2008/0273766 A1 11/2008 Kim et al.
(Continued)

FOREIGN PATENT DOCUMENTS

CN 107750460 A 3/2018
KR 1020170082025 7/2017
(Continued)

OTHER PUBLICATIONS

International Search Report for PCT/US2020/051414 dated Dec. 30, 2020.
(Continued)

*Primary Examiner* — Stephen P Coleman
(74) *Attorney, Agent, or Firm* — McDonnell Boehnen Hulbert & Berghoff LLP

(57) ABSTRACT

An example method may include receiving, at a computing device, a digital image associated with a particular media content program, the digital image containing one or more faces of particular people associated with the particular media content program. A computer-implemented face recognition program together with a set of computational models associated with the particular media content program may be applied to the digital image to recognize one or more of the particular people in the digital image, together with respective geometric coordinates for each of the one or more detected faces. At least a subset of the set of the computational models may be associated with a respective one of the particular people. The digital image together may be stored in non-transitory computer-readable memory, together with information assigning respective identities of the recognized particular people, and associating with each respective assigned identity geometric coordinates in the digital image.

20 Claims, 5 Drawing Sheets

Related U.S. Application Data

(60) Provisional application No. 62/906,238, filed on Sep. 26, 2019.

(58) Field of Classification Search
USPC .......................................................... 382/118
See application file for complete search history.

(56) References Cited

U.S. PATENT DOCUMENTS

| | | |
|---|---|---|
| 2012/0106806 A1 | 5/2012 | Folta et al. |
| 2016/0379090 A1* | 12/2016 | Shah .................... G06V 40/172 |
| | | 382/118 |
| 2018/0121762 A1 | 5/2018 | Han et al. |
| 2019/0073520 A1 | 3/2019 | Ayyar et al. |

FOREIGN PATENT DOCUMENTS

| | | |
|---|---|---|
| KR | 1020180079894 | 7/2018 |
| WO | 2016205432 A1 | 12/2016 |

OTHER PUBLICATIONS

International Searching Authority Written Opinion for PCT/US2020/051414 dated Dec. 30, 2020.

Search Report (English Translation), China National Intellectual Property Administration, Application No. CN 202080067828.2, dated Sep. 30, 2022, 2 pages.

The First Office Action (English Translation), China National Intellectual Property Administration, Application No. CN 202080067828.2, dated Nov. 15, 2022, 6 pages.

\* cited by examiner

OBTAINING ARTIST IMAGERY FROM VIDEO CONTENT USING FACIAL RECOGNITION

CROSS-REFERENCE TO RELATED APPLICATIONS

This application is a continuation of U.S. patent application Ser. No. 16/720,200, filed Dec. 19, 2019, which claims priority under 35 U.S.C. § 119(e) to U.S. Provisional Patent Application Ser. No. 62/906,238, filed Sep. 26, 2019. Both of the aforementioned applications are incorporated herein by reference in their entireties.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method may include applying an automated face detection program implemented on a computing device to a first plurality of training digital images associated with a particular TV program to identify a first sub-plurality of the training digital images, each of which contains a single face of a first particular person associated with the particular TV program. The method may further include based on a first set of feature vectors determined for the first sub-plurality of training digital images, training a first computational model of a computer-implemented face recognition program for recognizing the first particular person in any given digital image. The method may also include applying the face recognition program together with the first computational model to a runtime digital image associated with the particular TV program to recognize the first particular person in the runtime digital image from among one or more faces detected, together with respective geometric coordinates, in the runtime digital image. The method may still further include storing, in non-transitory computer-readable memory, the runtime digital image together with information identifying the recognized first particular person and corresponding geometric coordinates of the recognized first particular person in the runtime digital image.

In another aspect, may include a system including one or more processors, and memory storing instructions that, when executed by the one or more processors, cause the system to carry out a set of operations. The operations may include applying an automated face detection algorithm to a first plurality of training digital images associated with a particular TV program to identify a first sub-plurality of the training digital images, each of which contains a single face of a first particular person associated with the particular TV program. The operations may further include based on a first set of feature vectors determined for the first sub-plurality of training digital images, training a first computational model of an automated face recognition algorithm for recognizing the first particular person in any given digital image. The operations may also include applying the automated face recognition algorithm together with the first computational model to a runtime digital image associated with the particular TV program to recognize the first particular person in the runtime digital image from among one or more faces detected, together with respective geometric coordinates, in the runtime digital image. The operations may still further include storing, in non-transitory computer-readable memory, the runtime digital image together with information identifying the recognized first particular person and corresponding geometric coordinates of the recognized first particular person in the runtime digital image.

In still another aspect, non-transitory computer-readable medium may have instructions stored thereon that, when executed by one or more processors of a system, cause the system to carry out a set of operations. The operations may include applying an automated face detection algorithm to a first plurality of training digital images associated with a particular TV program to identify a first sub-plurality of the training digital images, each of which contains a single face of a first particular person associated with the particular TV program. The operations may further include based on a first set of feature vectors determined for the first sub-plurality of training digital images, training a first computational model of an automated face recognition algorithm for recognizing the first particular person in any given digital image. The operations may also include applying the automated face recognition algorithm together with the first computational model to a runtime digital image associated with the particular TV program to recognize the first particular person in the runtime digital image from among one or more faces detected, together with respective geometric coordinates, in the runtime digital image. The operations may still further include storing, in non-transitory computer-readable memory, the runtime digital image together with information identifying the recognized first particular person and corresponding geometric coordinates of the recognized first particular person in the runtime digital image.

DETAILED DESCRIPTION

I. Overview

A. Image Content Identification System

Figure 1A:
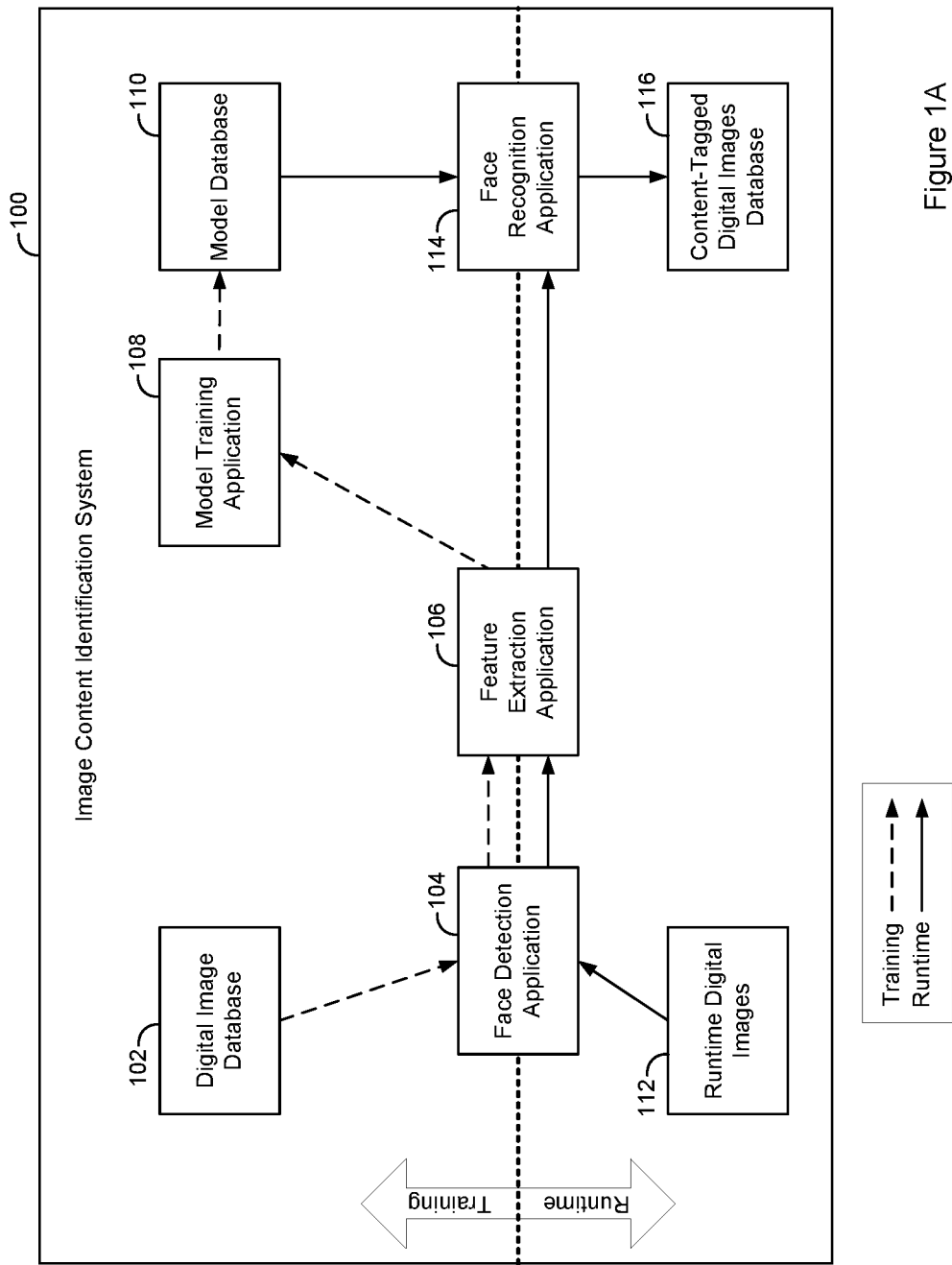
FIG. 1A is a simplified block diagram of an example image content identification system in which various disclosed principles can be implemented.

Content providers may provide various forms of image-based content to end users, including video content and still image content. A content provider may be a direct source of content for end users, or may provide content to one or more content distribution services, such as broadcasters, which then deliver selected content to end users. Content may include digital and/or analog still images and/or video images. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users.

A content provider and/or content distribution service may be interested in "tagging" or otherwise identifying certain visual features of delivered content to enable the identified features to be called out for attention or consideration to end users. Calling attention to visual features may be useful for content providers and/or content distribution services for promotional purposes, such as sponsor and/or product advertising, and program content promotion, and for example. Calling attention to visual features may also be part of value added services for end users.

Of particular interest may be identification of people associated with a content program, such as a TV program or packet network video streaming program. For example, there may be value in being able to identify cast members of a TV or streaming media program in any arbitrary still image or video frame of the program in order to display information, including data and/or other images, relating to the cast members. In an example embodiment, during broadcasting or streaming of a TV program, such as a sitcom or drama, an inset image of one or more of the cast members (e.g., actors) currently appearing in the broadcast stream may be displayed, together with some form of promotional text or audio. Other examples are possible as well, such as identification of crew or other personalities of a TV news program displayed in small side and/or inset images during a broadcast segment in which those personalities appear.

While there may be many beneficial reasons for generating such ancillary displays of cast, crew, and/or other personalities associated with a TV program broadcast or other media content delivery activity or operation, the capability of doing so may hinge to a degree on the ability to quickly and efficiently recognize those cast, crew, and/or other personalities within the delivered media content. In principle, media content stored and maintained by a media content provider (e.g., company) may be manually searched for particular personalities who, once identified in various program portions (e.g., video frames, still images, etc.), may be tagged with identifying information, including geometric coordinates in images, that may be stored in metadata associated with the particular content in which they were found. In practice, however, media content stored or maintained for delivery may be extremely voluminous, making the recognizing of particular persons associated with even a portion of the stored media content an impractically large task. It would therefore be advantageous to be able to examine large volumes of media content data, such as video frame and still images, for example, and automatically recognize particular and/or specific personalities (e.g., cast, crew, etc.) associated with the content, and to automatically generate associated metadata (or other ancillary data) that records information identifying the recognized personalities together with information specifying geometrically locations (e.g., rectangular coordinates) of the recognized personalities in the media content.

Accordingly, example embodiments are described herein of systems and methods for tagging visual and/or aesthetic features and/or imagery in video content, using facial detection and facial recognition. Example operation may be illustrated in terms of application to a TV program or other form of broadcast or streaming video content. A face recognition application program implemented on a computing device may be trained to recognize the face of a particular person associated with a particular TV program or other form of broadcast or streaming video. After training, the trained face recognition may be applied in runtime, possibly in real time, to other, arbitrary images or video segments associated with the TV program, in order to recognize the particular person in those images.

Training may involve providing a plurality of training digital images digital images that are associated with the particular TV program to a face detection application implemented on a computing device. The face detection application may be used to identify and select all those images from among the plurality that contain just a single face and are also known to contain the particular person. Doing so effectively filters out all digital training images that contain multiple faces. And if all the images are known to contain the particular person, then all of the selected training digital images will thus be images of the particular person only. The selected digital training images may then be input to a feature vector extraction application, which generates a respective feature vector corresponding to each digital training image. The feature vectors may then be used to train a computational model of the face recognition program. The trained model may be stored in a model database, together with information associating it with an identifier of the particular TV program and the particular person. A similar training process may be applied to digital training images associated with each of one or more additional persons associated with the particular TV program. In this way, a database of models associated with each of the one or more people associated with the particular TV program may be populated.

During runtime, a digital runtime image may be presented to the face detection program, which, in runtime a mode, first isolates regions or subareas of the digital runtime image that contain just one face. That is, while a given digital runtime image may contain multiple faces, the face detection program identifies individual faces and determines coordinates in the image of regions containing individual faces. The each region of the digital runtime image may be input to the face recognition application, which, in runtime mode, consults the model database for models associated with the particular TV program and determines, for each detected face, which model provides the best "fit" or identification. If the best fit for a given detected face (appearing in a given subarea of the digital runtime image) yields a probability greater than a predetermined threshold, then the detected face may be taken to be that of the person identified with the best matching model. Repeating this process for all of the detected faces of a given digital runtime image provide automated recognition of each identified face, together with the geometric coordinates of each face's location in the image. The digital runtime image, together with the identification and location information may be stored in a database of tagged image. By repeating this process for multiple digital runtime images associated with the particular TV program and/or other TV programs, and for the same or other people associated with the programs, the tagged database can be built up to contain identifying information for multiple digital runtime images for multiple TV programs and multiple associated people (e.g., cast, crew, etc.).

This automated process advantageously may provide images that may support a large body of tagged images for purposes such those described above. In particular, the automation of the training and runtime recognition and identification process enables a large volume of images to be tagged in an automated and practical manner. Details of example embodiments of methods and systems are described by way of example below.

II. Architecture

A. Image Content Identification System

FIG. 1A is a simplified block diagram of an example image content identification system 100. The image content identification system 100 can include various components, which may be implemented as or in one or more computing devices. As such, components of the image content identification system 100 may themselves be or include hardware, software, firmware, or combinations thereof. Non-limiting example components of the image content identification system 100 include a digital image database 102, a face detection application 104, a feature extraction application 106, a model training application 108, model database 110, runtime digital images 112, a face recognition application 114, and content-tagged digital images database 116. In the illustration of FIG. 1A, data inputs and outputs, such as runtime digital images 112, and content-tagged digital images database 116, are included as components of the system. In other representations, these might be considered separate from the system itself, and instead viewed as elements that are consumed, emitted, or acted upon by the system.

The image content identification system 100 can also include one or more connection mechanisms that connect various components within the image content identification system 100. By way of example, the connection mechanisms are depicted as arrows between components. The direction of an arrow may indicate a direction of information flow, though this interpretation should not be viewed as limiting. As described below, the image content identification system 100 may operate in a training mode and a runtime mode. For purposes of illustration, connection mechanisms that serve training operation are depicted with dashed lines, while connection mechanisms that serve runtime operation are depicted with solid lines.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

As noted, the image content identification system 100 and/or components thereof can take the form of, be part of, or include or encompass, a computing system or computing device.

Figure 1B:
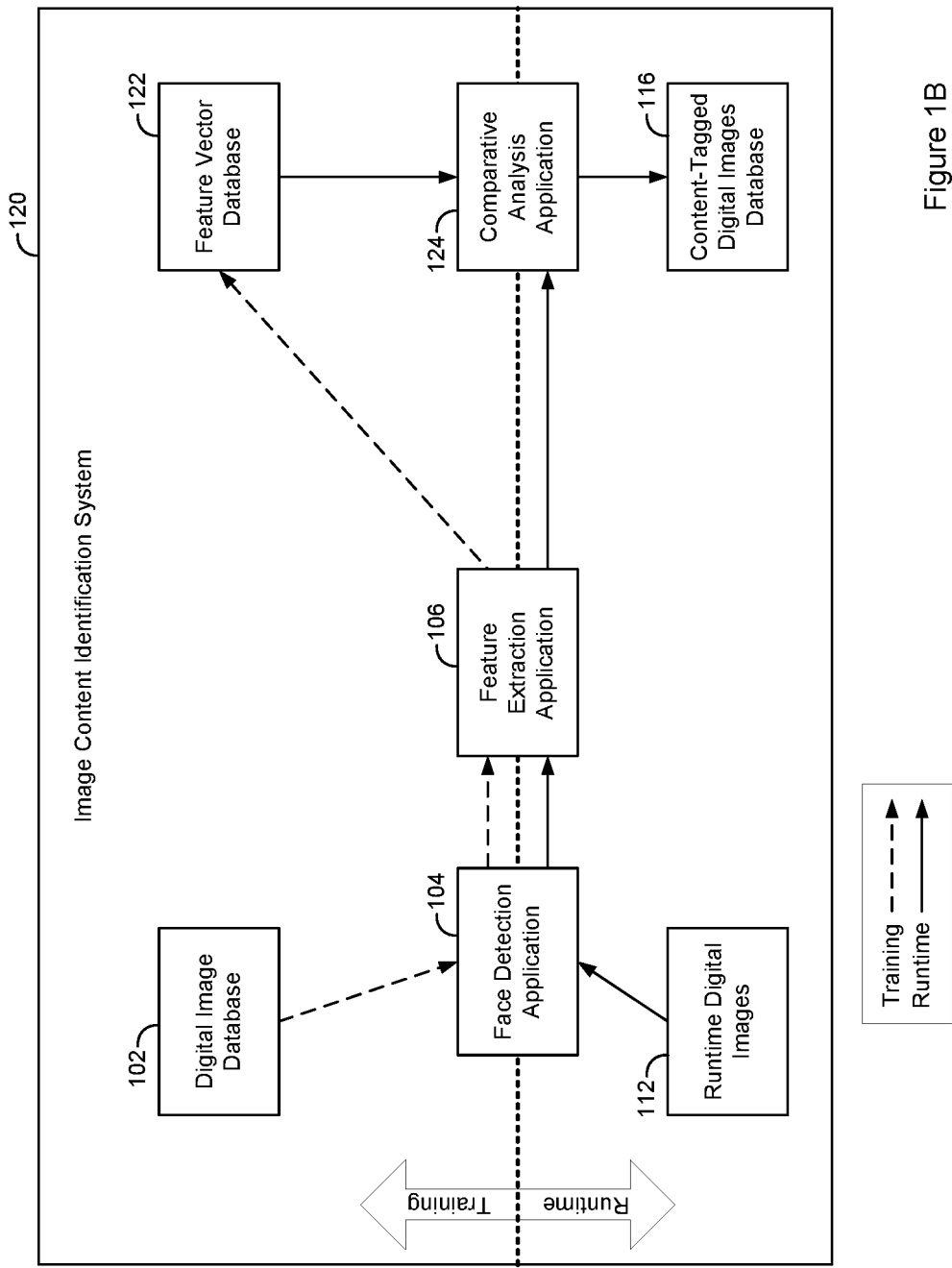
FIG. 1B is a simplified block diagram of another example image content identification system in which various disclosed principles can be implemented

FIG. 1B is a simplified block diagram of another example embodiment of an image content identification system 120. The image content identification system 120 is similar in certain respects to the example image content identification system 100 of FIG. 1A. As with the image content identification system 100, components of the image content identification system 120 may themselves be or include hardware, software, firmware, or combinations thereof. Non-limiting example components of the image content identification system 120 include the digital image database 102, the face detection application 104, the feature extraction application 106, the runtime digital images 112, a feature vector database 122, a comparative analysis application 124, and content-tagged digital images database 116. As in FIG. 1A, data inputs and outputs of the image content identification system 120, such as runtime digital images 110 and content-tagged digital images database 116, are included as components of the system. In other representations, these might be considered separate from the system itself, and instead viewed as elements that are consumed, emitted, or acted upon by the system.

The image content identification system 120 can also include one or more connection mechanisms that connect various components within the image content identification system 120. As with the image content identification system 100, the image content identification system 120 may operate in a training mode and a runtime mode. For purposes of illustration, connection mechanisms that serve training operation are depicted with dashed lines, while connection mechanisms that serve runtime operation are depicted with solid lines.

As with the image content identification system 100, the image content identification system 120 and/or components thereof can take the form of, be part of, or include or encompass, a computing system or computing device.

In example embodiments, an image content identification system, such as, but not limited to, systems 100 and 120, may be operated by a media content provider in order to add value to a media distributer that obtains media from the provider and distributes it to end users. Additionally or alternatively, a media distributor may operate an image content identification system to add value to media content obtained from a media content provider. Other implementation and embodiments are possible. It should be understood that example operation described herein of example image content identification systems is not intended to limit the contexts in which the example systems may be implemented and/or operated.

B. Computing System

Figure 2:
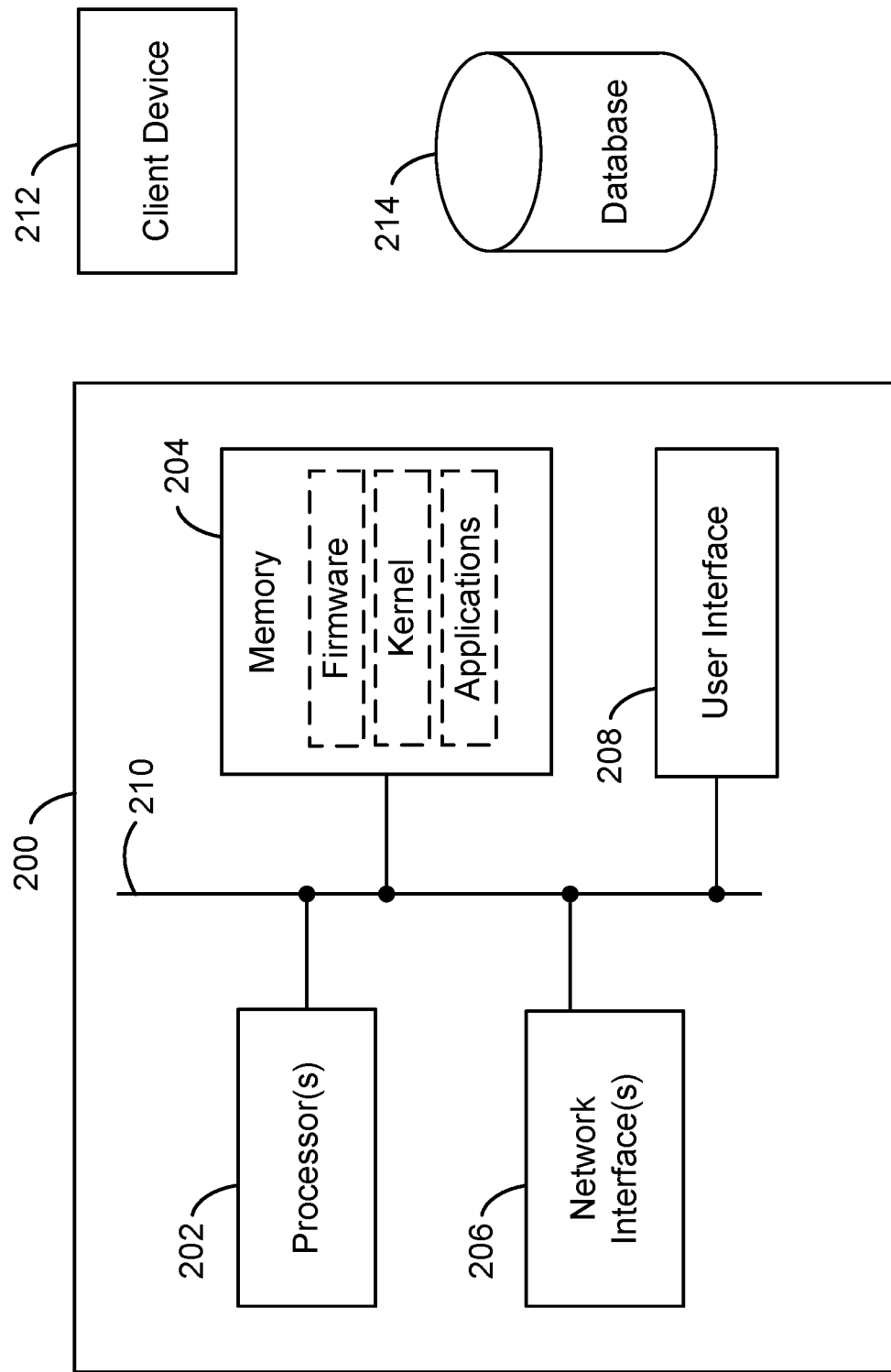
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, that may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 100 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such as the digital image database 102, the runtime digital images 112, content-tagged digital images database 116, and/or feature vector database 122, referenced above and described in more detail below.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations

The example image content identification systems 100 and 120 and/or components thereof can be configured to perform and/or can perform one or more acts. Examples of these and related features will now be described.

Generally, both of the image content identification systems 100 and 120 may operate in two modes: training mode and runtime mode. In training mode, the image content identification systems 100 and 120 may be "trained" to recognize particular faces or faces of particular people from known images of the particular faces or faces of the particular people. In runtime mode, the image content identification systems 100 and 120 may operate to recognize a face in an image as being that of one of the faces learned in training mode. Also in runtime mode, the image content identification systems 100 and 120 may operate to determine geometric coordinates in an image of one or more recognized faces, and then store the image with information or data that identifies one or more people recognized in the image together with the determined coordinates of the associated recognized faces.

Example operation of both embodiments will be described in terms of common operations carried out by both, as well as operations that differ according to different aspects of the two example embodiments. In addition, operation will be described by way of example in terms of television (TV) programs. However, operation may also be described and/or apply to other types of media content or "entities," besides TV or TV programs. Non-limiting examples may include sporting events, movies, and user-hosted and/or user-generated content (e.g., YouTube®). Non-limiting examples of modes of content delivery may be by way of network-based broadcast or streaming, such as via the Internet or other public packet network, or free, over-the-air broadcasting. End user access may be wired and/or wireless.

Operation of both image content identification systems 100 and 120 in training mode may typically involve a number of steps or procedures carried out by or with one or more components of the image content identification systems 100 and/or 120. In accordance with example embodiments, digital images (e.g., content) associated with one or more particular television (TV) programs may be stored in a digital image database 102. There could be more than one such database, and there could be other sources of digital images associated with the one or more particular TV programs. Images used for training may sometimes be referred to as "training images." It will be appreciated that digital images could be associated with to other types of media entities, besides TV or TV programs.

In example embodiments, a TV program (or other types of media entities) may be assigned an identifier and may have various people or persons associated with it, such as cast and/or crew members (e.g., of a situation comedy or drama, for example), on-air and/or crew members (e.g., of a news or entertainment reporting show/program), and so on. Further, TV programs may be broadcast and/or streamed live or in pre-recorded form. Other delivery means and/or modes may be used as well.

Each digital image associated with a given particular TV program may include or contain one or more faces of people or persons associated with the given particular TV program. For example, a digital image may be or include faces of one or more cast members of the particular TV program. Operation in training mode may be described by way of example in terms of recognition of cast members of the given particular TV program. It will be appreciated that operation could also be applied to other people or persons associated with the given particular TV program and/or to more than one TV show, such as directors, producers, and/or other crew members, for example.

An initial action may involve providing multiple digital images associated with the given particular TV program to the face detection application 104, as indicated in both FIGS. 1A and 1B by the dashed arrow from the digital image database 102 to the face detection application 104. For each cast member of the given particular TV show, the face detection application 104 may identify a subset of digital images that include only one face. For example, in this initial action, all digital images that are determined to include or contain two or more faces (e.g., of two or more cast members) may be discarded from further consideration in training. In an example embodiment, the face detection application 104 may include computer-executable instructions configured for carrying out a known or custom-developed face detections algorithm. Computer-executable instructions for known face detection algorithms may be available as open source code and/or as commercially available programs.

In accordance with example embodiments, each digital image in the digital image database 102 may be stored with or in association with a program identifier (ID), such that selection of digital images associated with the given particular TV program may be made based on the program ID. Also in accordance with example embodiments, each digital image may be stored with or in association with one or more person IDs that indicate one or more cast members known to be in the digital image. Further, each cast member may have or be assigned a persistent or unique person ID that may be used to identify the cast member across all digital images and TV programs represented in the system (and possibly beyond).

According to this example operation, the face detection application 104 in training mode may identify, for each respective cast member of the given particular show, a subset of digital images that include or contain only the respective cast member (i.e., just one face). Applying this operation to all or at least more than one of the cast members may therefore generate or create a subset of such digital images for each cast member to which this operation is applied. Thus, a given subset corresponds to a collection of digital images each of which includes or contains just one face, and all of which are faces of the same cast member. Each subset may be identified according to the person ID of the cast member and the program ID of the given particular TV program.

At the next training action, each subset may be input to the feature extraction application 106, which may generate a feature vector ("extract features") for each digital image in the subset. As is known, a feature vector may include a set of numbers (extracted features) that quantify in some way characteristics and/or properties of a face as represented in a digital (or digitized) image. In an example embodiment, a feature vector may include 128 numbers, though other feature-vector dimensions (e.g., with more or fewer numbers) may be possible as well. In practice, a two or more facial feature vectors that are similar may correspond to the same or similar-appearing faces. The degree of similarity of two feature vectors may be determined by computing an inner product ("dot product") of the two feature vectors. Other distance measures between feature vectors could be used as well or instead, such as Euclidean and/or cosine distances, for example. (A dot product may be considered equivalent to a normalized cosine distance.) Thus, two or more feature vectors determined to be the same or sufficiently similar may correspond to digital images of the same person. In an example embodiment, the feature extraction application 106 may be include computer-executable instructions configured for carrying out a known or custom-developed feature extraction algorithm. Computer-executable instructions for known feature extraction algorithms may be available as open source code and/or as commercially available programs.

In accordance with example embodiments, the output of the feature extraction application 106 may be a respective set of feature vectors for each respective cast member associated with the given particular TV program. The same program ID and person ID associated with the subset of digital images of a respective cast member may be assigned to or associated with the subset of feature vectors for the respective cast member.

From this point on, example training mode operation of the image content identification system 100 differs in certain respects from that of the image content identification system 120.

In example training mode operation of the image content identification system 100, the set of feature vectors generated by the feature extraction application 106 for each respective cast member may be input to the model training application 108, as indicated by the dashed arrow from the feature extraction application to the model training application 108. The model training application 108 may be a statistical model or other analytical framework that may be adjusted ("trained") to evaluate the likelihood that a later-supplied feature vector corresponds to the same face as that associated with the respective set of feature vectors used to train the model. In an example embodiment, a model may correspond or include an artificial neural network (ANN) or other machine learning algorithm. Once a model is trained for a respective cast member of a given TV program, it may be stored in the model database 110, as indicated by the dashed arrow from the model training application to the model database 110. The model training as just described may be carried out for the set of feature vectors corresponding to each respective cast member of the given TV program. Once all the trained models are stored in the model database 110, training of the image content identification system 100 for the given TV program may be considered complete, or at least available for application in runtime operation, described below. In an example embodiment, the model database 110 may be updated or revised from time to time, for example as new and/or additional digital images become available and/or are processed according the above actions.

In example operation of the image content identification system 120, the sets of feature vectors generated by the feature extraction application 106 may be stored in the feature vector database 122, as indicated by the dashed arrow from the feature extraction application to the feature vector database 122. Once a set of feature vectors for a respective cast member of a given TV program is generated and stored, as just described, training of the image content identification system 120 for the respective cast member of the given TV program may be considered complete, or at least available for application in runtime operation, described next. In an example embodiment, the feature vector database 122 may be updated or revised from time to time, for example as new and/or additional digital images become available and/or are processed according the above actions.

It may be noted that each feature vector in a given set may be associated with a different digital image of the same given cast member of a given TV program. For example, a subset of digital images of the given cast member may correspond to images captured in different settings or circumstances within or outside of the context of the given TV program. As such, there can be different feature vectors for the same cast member in a given set. For the image content identification system 120, there may also be different feature vectors for the same cast member in in the feature vector database 122.

Initial operation in runtime mode is the same for both the image content identification system 100 and the image content identification system 120.

Operation of both the image content identification system 100 and the image content identification system 120 in runtime mode may involve applying stored training models (e.g., in the model database 110) or stored training data (e.g., in the feature vector database 122) to unknown and/or previously unexamined and/or unanalyzed digital images—referred to herein as "runtime" images—associated with the given particular TV program, in order to identify faces in the runtime images, and in order to generate information relating to the identities of cast members and the respective geometric coordinates of their faces in the runtime images. Operation may be illustrated by considering just one runtime image retrieved from or sent by runtime images 110 as input to the face detection application 104, now operating in runtime mode. A given runtime image may include or have an identifier that associates the given runtime image with a particular TV program. This identifier may be carried or referenced in subsequent runtime operation in order to associate results of recognition operations with the particular TV program, for example.

In accordance with example embodiments, the face detection application 104 may detect individual faces in the given runtime image associated with the particular TV program using one or another known technique. In doing so, the face detection application 104 may also effectively isolate or crop different regions of the given runtime image, where each region contains or includes just one face. For example each region may correspond to a rectangular grouping of image pixels that frame a single face. The rectangular region may be defined by a number of pixels in each of two orthogonal directions (e.g., vertical and horizontal directions), and pixel (or other geometric) coordinates of a reference pixel (or point) in the given runtime image of the region. For example, the reference pixel could correspond to pixel coordinates in the given runtime image of one corner of the rectangular region. Other forms of geometric coordinates and/or reference points may be used. Note that unlike training images that are selected following the face detection step for including just one face, runtime images may include multiple faces.

The output of the face detection application 104 may be provided to the feature extraction application 106, now also operating in runtime mode. The output may be the given runtime image and the information specifying the locations and boundaries of the regions identified or determined as each including just one face. With the given runtime image and the coordinate information, the feature extraction application 106 may generate a respective facial feature vector (e.g., extract features) associated with each respective region (or the face within each respective region).

In accordance with example embodiments, the output of the feature extraction application 106 in runtime mode may be a set of one or more feature vectors each associated with a respective one of the regions of the given runtime image identified by the face detection application 104. Feature vectors generated at runtime may be referred to herein as "runtime feature vectors," though they are generally produced in the same manner as those generated during training mode operation by the feature extraction application 106. Each runtime feature vector generated in runtime mode may also be associated with geometric coordinates of the corresponding region. The output feature vectors from runtime operation of the feature extraction application 106 may then be provided as input to one or another form of face recognition in order to determine if one or more of the detected faces in the runtime image may be identified (recognized) with a known face from one of the training databases, for example.

From this point on, example runtime operation differs in certain respects between the image content identification system 100 and the image content identification system 120. Example runtime operation of the image content identification system 100 is described first.

In accordance with example embodiments, in example runtime operation of the image content identification system 100, the set of one or more runtime feature vector from the feature extraction application 106 may be input to the face recognition application 114, as indicated by the solid arrow from the feature extraction application 106 to the face recognition application 114. As noted, the set of runtime feature vectors will be associated with the particular TV program by virtue of an identifier associated with the given runtime image, and each runtime feature vector of the set will be associated (e.g., have) respective geometric coordinates in the given runtime image.

The face recognition application 114 may use the identifier of the particular TV program to retrieve one or more models associated with the particular TV program from the model database 110. In the current illustrative example, each of the one or more retrieved models may correspond to the face of one of the cast members of the particular TV program. (As noted above, other roles of persons associated with TV programs may be used or included, such as crew members, producers, etc.; and other types of media entities may be used or included.) With retrieved models, the face recognition application 114 may then try to identify each face in the given runtime image and associated with a respective runtime feature vector of the set with a respective cast member of the particular TV program, according to the retrieved model for the respective cast member's face. The face recognition application 114 may be applied to each runtime feature vector of the set, thereby identifying, or at least attempting to identify, each face detected in the given runtime image.

The face recognition application 114 may use or be based on one or another known technique or algorithm. It may further use or be based on existing open source and/or commercial software or application programs. Additionally or alternatively, the face detection application 114 may be wholly or partly custom developed in-house. Non-limiting examples of face recognition algorithms or techniques that may be used in the face detection application 114 may include machine learning models, statistical learning models, and artificial neural networks, including deep networks and/or deep learning models.

For each runtime feature vector, the face detection application 114 may determine a statistical likelihood of a match with one or more of the retrieved models, and provide the maximum of each of one or more determined likelihoods as a most likely (best) match. If the most likely match has a computed likelihood greater than a threshold value, then an identification of the face associated with the runtime feature vector with the face associated with the best matching model may be deemed to have been made. In an example embodiment, a threshold of 0.6 (60%) for a match may be used. Other threshold values and/or criteria may be used as well.

In some instances, more than one runtime feature vector associated with a given runtime image may match the same retrieved model, indicating that more than one face detected in the given runtime image matches the same cast member's face. This could be the case, for instance, when a particular cast member's face appears more than once in the given runtime image. In such a case, the face detection application 114 may identify only the best matching face from the given runtime image with the particular cast member associated with the matching model, and leave the other detected faces in the runtime image that also match the particular cast member as "unidentified," for example. Other ways of handling multiple recognitions of the same cast member's in a given runtime image may also be used. For example each of the multiple recognitions above a threshold probability of matching the model of the same cast member could be deemed identifications with the same cast member.

By performing the face recognition for each runtime feature vector, each detected face in the given runtime image may be identified with a face of a cast member of the given particular TV program. Further, since each face in the given runtime image will have associated geometric coordinates in the runtime image as determined by the face detection application 104, the output of the face recognition application 114 may include the given runtime image together with information that identifies each face in the runtime image with a cast member of the associated particular TV, and geometric coordinates specifying where each identified face is located in the runtime image. The information may also include an identifier of the given particular TV program. The identifying information and coordinates may be considered as "tagging" the content of the runtime image. The runtime image and this associated information may then be stored in the content-tagged digital images database 116. This is indicated by the solid arrow from the face recognition application 114 to the content-tagged digital images database 116.

Example runtime operation of the image content identification system 120 is described next.

In accordance with example embodiments, in example runtime operation of the image content identification system 120, the set of one or more runtime feature vector from the feature extraction application 106 may be input to the comparative analysis application 124, as indicated by the solid arrow from the feature extraction application 106 to the comparative analysis application 124. Again, as noted, the set of runtime feature vectors will be associated with the particular TV program by virtue of an identifier associated with the given runtime image, and each runtime feature vector of the set will be associated (e.g., have) respective geometric coordinates in the given runtime image.

The comparative analysis application 124 may compare each runtime feature vector with some or all of the feature vectors in the feature vector database 122 in order to identify one or more of the faces in the given runtime image (as represented by their respective, corresponding feature vectors) with known faces as represented by their respective, corresponding feature vectors in the feature vector database 122. A comparative analysis may be performed for each runtime-generated feature vector using one or more known analytical techniques. For example, for each runtime generated feature vector, an inner product may be computed against all or some of the feature vectors in the feature vector database 122, and a maximum value of the results used to identify a most likely match. If the most likely match is greater than a threshold value, then an identification of the face associated with the runtime-generated feature vector with the face associated with the best matching feature vector in the feature vector database 122 may be deemed to have been made. In an example embodiment, a threshold of 0.6 (60%) for a normalized inner product may be used. Other threshold values and/or criteria may be used as well.

Similarly to runtime operation of the image content identification system 100, runtime operation of the image content identification system 120 may sometimes result in more than one runtime feature vector associated with a given runtime image matching the same retrieved feature vector from the feature vector database 122, indicating that more than one face detected in the given runtime image matches the same cast member's face. In such a case, the comparative analysis application 124 may identify only the best matching face from the given runtime image with the particular cast member associated with the matching feature vector from the feature vector database 122, and leave the other detected faces in the runtime image that also match the particular cast member as "unidentified," for example. Other ways of handling multiple recognitions of the same cast member's in a given runtime image may also be used. For example each of the multiple recognitions could be deemed identifications with the same cast member.

Other forms of comparative analysis may be used as well. For example, a statistical maximum likelihood analysis may be calculated for each runtime feature vector to identify a best-match feature vector in the feature vector database 122. The solid arrow from the feature vector database 108 to the comparative analysis application 124 in FIG. 1B may be taken to represent access to the feature vector database 122 by the comparative analysis application 124 during runtime operation. Additional and/or alternative techniques may include or entail using machine learning models, for example involving or based on neural networks.

By performing the comparative analysis for each runtime generated feature vector, each face in the runtime image may be identified with a face of a cast member of the given particular TV program. Further, since each face in the runtime image will have associated geometric coordinates in the runtime image as determined by the face detection application 104, the output of the comparative analysis application 112 may include the runtime image together with information that identifies each face in the runtime image with a cast member of the associated particular TV, and geometric coordinates specifying where each identified face is located in the runtime image. The information may also include an identifier of the given particular TV program. The identifying information and coordinates may be considered as "tagging" the content of the runtime image. The runtime image and this associated information may then be stored in the content-tagged digital images database 116.

For both image content identification systems 100 and 120, the tagging information—namely the identifier of the particular TV show, one or more identifiers of cast members in the runtime image, and coordinates in the runtime image of cast members' faces—may be considered "metadata" associated with the runtime image. Thus, content-tagged digital images may be considered as runtime digital images together with the above-defined metadata. Once stored in the content-tagged digital images database 116, runtime processing for a given runtime image may be considered complete. It will be appreciated that completed runtime processing of a runtime digital image may still be updated and/or revised from time to time, for example to identify previously unidentified faces that may not have been matched in a previous matching procedure.

In accordance with example embodiments, content-tagged digital images may be used in a variety of ways. For example, targeted digital image display during program broadcasting of a particular TV program may display an image from the particular TV program together with annotations, comments, or overlaid graphics directed to cast members shown in the image. Associated metadata may thus be used to customize the annotations, comments, or graphics to the cast member identities and their locations in the image. Other uses are possible as well.

Typically, there may be a large number of TV programs for which the availability of content-tagged digital images may be desirable. Each program may have a large number of associated images, and a large number of cast members. For at least these reasons, generating or creating content-tagged digital images on a scale that matches the number of possible TV program and the number of possible cast members can be a prohibitively expensive and/or impractical or tedious task. Advantageously, example embodiments of the image content identification system operating in accordance with the example operation, or other similar variations, can automate the process in an efficient and scalable manner. As such, example embodiments may generate or produce, and make available, content-tagged digital images on a large and practical scale.

In some embodiments, runtime operation may be carried out in real time, as media content is being broadcast or streamed. For example, during streaming of video content corresponding to a TV program, one or more individual video frames may be processed for recognizing cast members of the TV program and tagging the frames as described above. Then, as the one or more video frames are displayed to end users, the tagging may be used to display promotional or other information relating to the TV program. Tagging done in real time may also be used to update an existing content-tagged database. In other embodiments, an existing content-tagged database may be used to create promotional or other informational displays associate with video frames as they are delivered to end users, based on coordination of the streaming with the known content of the tagged database. Other example use cases are possible as well.

In accordance with example embodiments, the storage of individual feature vectors in the feature vector database 122 of the image content identification system 120 may be used to straightforwardly expand the scope of search and identification during runtime operation. Specifically, as noted above, each feature vector in a given set may be associated with a different digital image of the same given cast member of a TV program, so that there can be different feature vectors for the same cast member in a given set stored in the feature vector database 122. However, the feature vector database 122 may be generalized so that the association of feature vectors with a particular TV program may be used as a form of selection criteria or selection filter. That is, the set of feature vectors for a given cast member may be generalized as identifying the given actor (or other type of cast, crew, etc.), independently of one or more particular TV programs, movies, shows, or roles that the given cast member may be associated with. For example, the sources of the training feature vectors—e.g., training digital images containing the given cast member—may be associated with some or all TV programs, movies, etc., that the given cast member is or has been involved in. Each training feature vector for the given cast member may still be stored in the feature vector database 122 in association with one or another particular TV program, movie, show, etc. But the training feature vectors for the given cast member may be used as a global database of feature vectors for the given cast member, while the associations of the feature vectors with respective TV programs, movies, etc., may be applied during runtime as selection criterial. As such, the feature vector database 122 may be used as a global database of feature vectors for the given cast member, and searched in runtime operation without regard for association with a given TV program. The use of the feature vector database 122 as a global database may be applied to other cast member, crew, or personalities as well.

Search and/or selection criteria may be applied globally, or on some restricted basis. For example, if no selection criteria are applied, a search may be considered global, to the extent that a runtime feature vector may be identified with a particular person in the feature vector database 122 without regard to any particular TV program or other association. Conversely, restricting selection to a particular TV program during runtime may provide the same functionality described above in connection with an assumed association of feature vectors with TV programs. Other selection criteria combinations could be applied as well, such as two or more particular TV programs.

Also in accordance with example embodiments, the image content identification system 100 may also be expanded for global (or partially restricted) search and identification. In an example embodiment, this may be achieved by retaining the training feature vectors in a database, such as the feature vector database 122, and constructing and/or training a new model for each new selection of feature vectors. For example, feature vectors for a given actor selected according to two or more particular TV programs or movies could be used to train a model for the given actor and the selected programs. The model could then be applied at runtime in a manner described above. Each new set of selection criteria would be associated with its own model.

Figure 3:
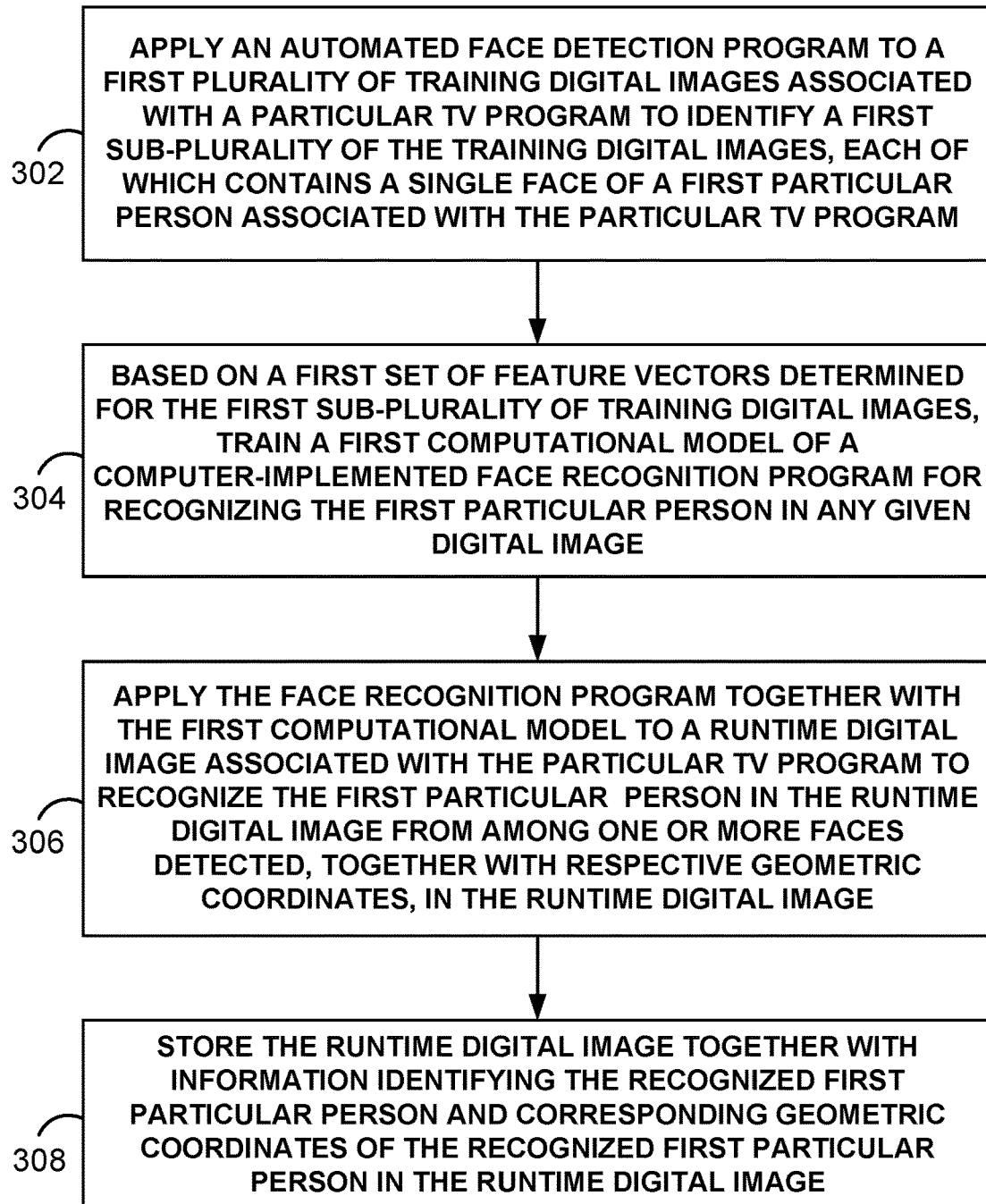
FIG. 3 is a flow chart of an example method.

FIG. 3 illustrates a flow chart of an example method 300 that may be carried out by an image content identification system, such as image content identification system 100. Example method 300 may be implemented in computer-readable instructions stored in a non-transitory computer-readable medium, and carried out by one or more processors of a system. In an example embodiment, the instructions, when carried out by the one or more processors of the system, may cause the system to carry out the method. The example method 300 is described in terms of training and runtime recognition of just one person associated with just one TV program. In view of the above description, and as further elaborated, it will be appreciated that the example method can be straightforwardly extended to multiple persons (e.g., cast members) associated with the TV program, and to multiple TV programs. The description below refers to a computing device involved in a number of the operations. It should be understood that multiple references to a computing device may refer to the same computing device in some or all of the operations, or a different computing devices in some or all of the operations.

At block 302, an automated face detection program implemented on a computing device may be applied to a first plurality of training digital images associated with a particular TV program in order to identify a first sub-plurality of the training digital images each of which contains a single face of first particular person associated with the particular TV program. In an example embodiment or in example usage, the first particular person may be a cast or crew member of the particular TV program. The first plurality of training digital images may be considered training images in the sense discussed above.

At block 304, a first set of feature vectors determined for the first sub-plurality of training digital images may be used to train a first computational model of a computer-implemented face recognition program for recognizing the first particular person in any given digital image.

At block 306, the face recognition program together with the first computational model may be applied to a runtime digital image associated with the particular TV program in order to recognize the first particular person in the runtime digital image from among one or more faces detected, together with respective geometric coordinates, in the runtime digital image.

Finally, at block 308, the runtime digital image together with information identifying the first particular person and corresponding geometric coordinates of the first particular person in the runtime digital image may be stored in a non-transitory computer-readable memory.

In accordance with example embodiments some or all of the above operations may be applied to a second particular person associated with the particular TV show, and/or to another TV program with different (and possibly some or all of the same) associated people (e.g., cast members). For example, the automated face detection program may be applied to a second plurality of training digital images to generate a second sub-plurality of the training digital images, and a second set of feature vectors determined for the second sub-plurality of training digital images may be used to train a second computational model of the face recognition program for recognizing the second particular person in any given digital image. The face recognition program, together with the second computational model, may subsequently be applied to a further runtime digital image associated with the particular TV program to recognize the second particular person in the further runtime digital image from among one or more faces detected, together with respective geometric coordinates, in the further runtime digital image. Finally, the further runtime digital image together with information identifying the second particular person and corresponding geometric coordinates of the second particular person in the runtime digital image may be stored in the non-transitory computer-readable memory.

In accordance with example embodiments, the first plurality and second plurality of training digital images may be at least partially overlapping.

In accordance with example embodiments, the runtime digital image and the further runtime digital image may be the same common runtime digital image. In this case, both (i) the information identifying the first particular person and corresponding geometric coordinates of the first particular person in the runtime digital image, and (ii) the information identifying the second particular person and corresponding geometric coordinates of the second particular person in the further runtime digital image, may be stored with the common digital image.

In further accordance with example embodiments, the method 300 may entail determining the first set of feature vectors, where each feature vector of the first set of feature vectors corresponds to a respective one of the first sub-plurality of training digital images.

In further accordance with example embodiments, the method 300 may entail storing the first computational model, together with an identifier of the particular TV program and an identifier of the first particular person, in a database of computational models of the face recognition program.

In accordance with example embodiments, applying the face recognition program together with the first computational model to the runtime digital image associated with the particular TV program may entail determining a runtime feature vector corresponding to at least one of the one or more faces detected together with respective geometric coordinates, in the runtime digital image. The face recognition program together with one or more stored computational models associated with the particular TV program, including the first computational model, may be applied to the runtime feature vector. It may then be determined that applying the face recognition program together with the first computational model to the runtime feature vector yields a probability that both exceeds a threshold and is greater than probabilities yielded from applying the face recognition program together with any of the other one or more stored computational models associated with the particular TV program.

In accordance with example embodiments, the computer-implemented face recognition program and the automated face detection program may both be implemented on the same computing device, or each may be implemented on a different computing device.

In accordance with example embodiment the example method 300 may further entail applying the face recognition program together with the first computational model to an additional runtime digital image associated with the particular TV program to again recognize the first particular person in the additional runtime digital image from among one or more faces detected, together with respective geometric coordinates, in the additional runtime digital image, and then storing, in the non-transitory computer-readable memory, the additional runtime digital image together with information identifying the again recognized first particular person and corresponding geometric coordinates of the recognized first particular person in the additional runtime digital image.

In accordance with example embodiment the example method 300 may further entail applying the automated face detection program to a third plurality of training digital images associated with a further particular TV program to identify a third sub-plurality of training digital images, each of which contains a single face of a third particular person associated with the further particular TV program. Then, based on a third set of feature vectors determined for the third sub-plurality of training digital images, training a third computational model of the face recognition program for recognizing the third particular person in any given digital image. The face recognition program together with the third computational model may then be applied to a further runtime digital image associated with the further particular TV program in order to recognize the third particular person in the further runtime digital image from among one or more faces detected, together with respective geometric coordinates, in the further runtime digital image. Finally, the further runtime digital image may be stored together with information identifying the recognized third particular person and corresponding geometric coordinates of the recognized third particular person in the further runtime digital image.

Example method 300 as described entails operation of both training and runtime modes. An alternative version considers primarily just the runtime operations, with the training mode operations being considered as having been previously carried out. This version of the example method 300 may be described by the following operations.

First, receiving a runtime digital image associated with a particular TV program, where the runtime digital image contains one or more faces of particular people associated with the particular TV program.

Second, applying a computer-implemented face recognition program together with the set of computational models associated with the particular TV program to the digital image to recognize one or more of the particular people in the digital image from among one or more faces detected, together with respective geometric coordinates for each of the one or more detected faces, in the runtime digital image, where each of the computational models is further associated with a respective one of the particular people.

Third, storing, in non-transitory computer-readable memory, the runtime digital image together with information (i) indicating the identities assigned to the one or more faces contained in the runtime digital image, and (ii) associating with each assigned identity geometric coordinates in the runtime digital image of the face to which the identity is assigned.

Figure 4:
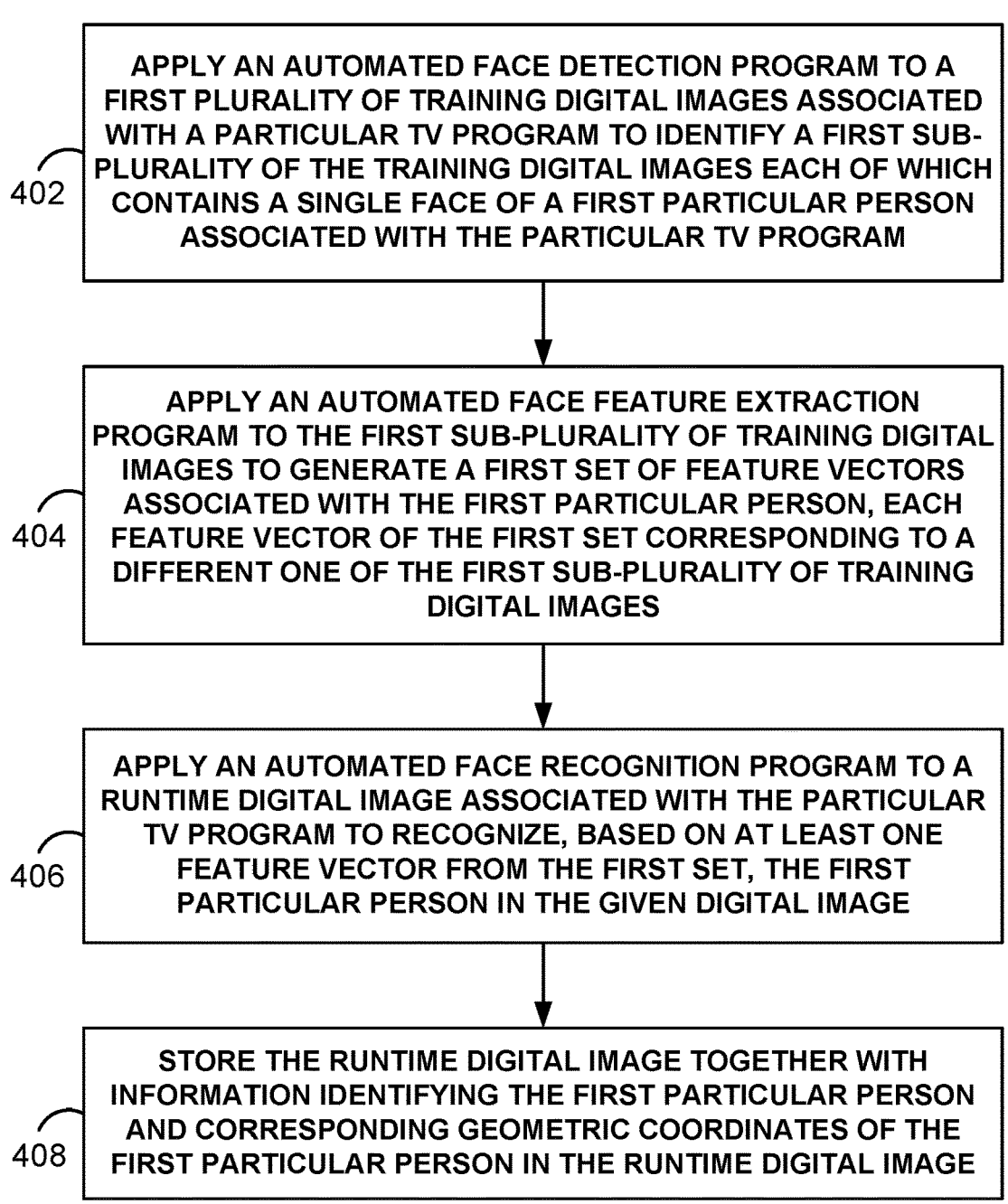
FIG. 4 is a flow chart of another example method.

FIG. 4 is described next.

FIG. 4 illustrates a flow chart of an example method 400 that may be carried out by an image content identification system, such as image content identification system 120. As with example method 300, example method 400 may be implemented in computer-readable instructions stored in a non-transitory computer-readable medium, and carried out by one or more processors of a system. In an example embodiment, the instructions, when carried out by the one or more processors of the system, may cause the system to carry out the method. The example method 400 is described in terms of training and runtime recognition of just one person associated with just one TV program. In view of the above description, and as further elaborated, it will be appreciated that the example method can be straightforwardly extended to multiple persons (e.g., cast members) associated with the TV program, and to multiple TV programs. The description below refers to a computing device involved in a number of the operations. It should be understood that multiple references to a computing device may refer to the same computing device in some or all of the operations, or a different computing devices in some or all of the operations.

At block 402, an automated face detection program implemented on a computing device may be applied to a first plurality of training digital images associated with a particular TV program in order to identify a first sub-plurality of the training digital images each of which contains a single face of a first particular person associated with the particular TV program. In an example embodiment or in example usage, the first particular person may be a cast or crew member of the particular TV program. The first plurality of training digital images may be considered training images in the sense discussed above.

At block 404, an automated feature extraction program implemented on a computing device may be applied to the first sub-plurality of training digital images in order to generate a first set of feature vectors associated with the first particular person, each feature vector of the first set corresponding to a different one of the first sub-plurality of training digital images.

At block 406, the automated face recognition program implemented on a computing device may be applied to a runtime digital image associated with the particular TV program in order to recognize, based on at least one feature vector from the first set, the first particular person in the runtime digital image. The runtime digital image may be considered a runtime image in the sense discussed above.

Finally, at block 408, the runtime digital image together with information identifying the first particular person and corresponding geometric coordinates of the first particular person in the runtime digital image may be stored in a non-transitory computer-readable memory.

In accordance with example embodiments some or all of the above operations may be applied to a second particular person associated with the particular TV show, and/or to another TV program with different (and possibly some or all of the same) associated people (e.g., cast members). As such, a second plurality of training digital images may be generated by the automated feature extraction program, and the automated face recognition program may be applied to a further runtime digital image.

In accordance with example embodiments, the first plurality and second plurality of training digital images may be at least partially overlapping.

In accordance with example embodiments, the runtime digital image and the further runtime digital image may be the same common runtime digital image. In this case, both (i) the information identifying the first particular person and corresponding geometric coordinates of the first particular person in the runtime digital image, and (ii) the information identifying the second particular person and corresponding geometric coordinates of the second particular person in the further runtime digital image, may be stored with the common digital image.

In accordance with example embodiments, the example method 400 may further entail applying the automated face recognition program to an additional runtime digital image associated with the particular TV program in order to recognize, based on at least one feature vector from the first set, the first particular person in the additional runtime digital image, and storing the additional runtime digital image together with information identifying the first person and corresponding geometric coordinates of the first particular person in the additional runtime digital image.

Example method 400 as described entails operation of both training and runtime modes. An alternative version considers primarily just the runtime operations, with the training mode operations being considered as having been previously carried out. This version of the example method 400 may be described by the following operations.

First, receiving a runtime digital image associated with a particular TV program, the runtime digital image containing one or more faces of particular people associated with the particular TV program.

Second, applying an automated feature extraction program implemented on a computing device to the digital image to generate a respective feature vector corresponding to each one of the one or more faces contained in the runtime digital image.

Third, performing, on a computing device, a comparative analysis of each respective feature vector with a set of known feature vectors, each known feature vector being identified with one of the people associated with the particular TV program, to assign an identity of one of the particular people to the one of the one or more faces corresponding to the respective feature vector.

Fourth, storing, in non-transitory computer-readable memory, the runtime digital image together with information (i) indicating the identities assigned to the one or more faces contained in the runtime digital image, and (ii) associating with each assigned identity geometric coordinates in the runtime digital image of the face to which the identity is assigned.

Example methods 300 and 400, as well as other possible example embodiments, may each be considered as a prescribed process for creating and storing a digital image tagged with specific metadata that identifies (i) a particular TV program (or other type of media entity), (ii) one or more cast members of (or other persons associated with) the particular TV program, and (iii) geometric coordinates in the digital image of faces of the one or more identified cast members. Other metadata may be created or determined as well. Thus, the present disclosure may be considered as describing example embodiments of a product or products—i.e., digital images and associated metadata—that are produced, created, or generated, and stored or recorded, according to one or more prescribed processes that are described herein by way of example. That is, the present disclosure includes example embodiments of a product defined, described, or specified in terms of the process by which the product is created.

IV. Example Variations

Although the examples and features described above have been described in connection with specific entities and specific operations, in practice, there are likely to be many instances of these entities and many instances of these operations being performed, perhaps contemporaneously or simultaneously, on a large scale. Indeed, in practice, the image content identification system 100 is likely to include many television broadcasting systems (each potentially transmitting content on many channels) and many content presentation devices, with some or all of the described operations being performed on a routine and repeating basis.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

receiving, at a computing device, a digital image associated with a particular media content program, the digital image containing one or more faces of particular people associated with the particular media content program;

applying a computer-implemented face recognition program together with a set of computational models associated with the particular media content program to the digital image to recognize one or more of the particular people in the digital image from among one or more faces detected, together with respective geometric coordinates for each of the one or more detected faces in the digital image, wherein each of at least a subset of the set of the computational models is further associated with a respective one of the particular people; and storing, in non-transitory computer-readable memory, the digital image together with information (i) assigning respective identities of the recognized one or more of the particular people in the digital image, and (ii) associating with each respective assigned identity geometric coordinates in the digital image of a face to which the identity is assigned.

2. The method of claim 1, wherein at least one of the one or more of the particular people in the digital image is a cast member of the particular media content program.

3. The method of claim 1, wherein the particular media content program is one of: a television program, a movie, a sporting event, or a web-based user-hosted and/or user-generated content program.

4. The method of claim 1, wherein each of the computational models of the set has been trained for recognizing a different one a plurality of people associated with the particular media content program, wherein the plurality includes at least the particular people.

5. The method of claim 1, wherein applying the face recognition program together with the set of computational models associated with the particular media content program to the digital image to recognize the one or more of the particular people in the digital image from among the one or more faces detected, together with respective geometric coordinates for each of the one or more detected faces in the digital image, comprises:

determining a feature vector corresponding to at least one of the one or more faces detected, together with respective geometric coordinates, in the digital image;

applying the face recognition program together with the set of computational models to the feature vector; and determining that applying the face recognition program together with a particular model of the set of computational models to the feature vector yields a probability that both exceeds a threshold and is greater than probabilities yielded from applying the face recognition program together with any of the other computational models of the set.

6. The method of claim 5, wherein determining the feature vector corresponding to at least one of the one or more faces detected, together with respective geometric coordinates, in the digital image comprises:

applying a face detection program to the digital image to detect a spatial region of the digital image that includes the at least one of the one or more faces detected, together with respective geometric coordinates of the spatial region; and applying a computer-implemented feature extraction program to the spatial region of the digital image to generate the feature vector.

7. The method of claim 1, further comprising:

receiving a further digital image associated with a further particular media content program, the further digital image containing one or more faces of further particular people associated with the further particular media content program;

applying the computer-implemented face recognition program together with a further set of computational models associated with the further particular media content program to the further digital image to recognize one or more of the further particular people in the further digital image from among one or more further faces detected, together with respective geometric coordinates for each of the one or more further detected faces in the further digital image, wherein each of at least a further subset of the further set of the computational models is additionally associated with a respective one of the further particular people; and storing, in non-transitory computer-readable memory, the further digital image together with information (i) assigning respective identities of the recognized one or more of the further particular people in the further digital image, and (ii) associating with each respective assigned identity geometric coordinates in the further digital image of a further face to which the identity is assigned.

8. The method of claim 7, wherein the further digital image is different from the digital image,
wherein the further particular media content program is one of: different from the particular media content program, or the same as the particular media content program,
and wherein at least one of the recognized further particular people is one of: different from any of the recognized particular people, or the same as one of the recognized particular people.

9. A system comprising:
one or more processors; and
memory storing instructions that, when executed by the one or more processors, cause the system to carry out operations including:
receiving a digital image associated with a particular media content program, the digital image containing one or more faces of particular people associated with the particular media content program;
applying a face recognition program together with a set of computational models associated with the particular media content program to the digital image to recognize one or more of the particular people in the digital image from among one or more faces detected, together with respective geometric coordinates for each of the one or more detected faces in the digital image, wherein each of at least a subset of the set of the computational models is further associated with a respective one of the particular people; and
storing, in non-transitory computer-readable memory, the digital image together with information (i) assigning respective identities of the recognized one or more of the particular people in the digital image, and (ii) associating with each respective assigned identity geometric coordinates in the digital image of a face to which the identity is assigned.

10. The system of claim 9, wherein at least one of the one or more of the particular people in the digital image is a cast member of the particular media content program.

11. The system of claim 9, wherein the particular media content program is one of: a television program, a movie, a sporting event, or a web-based user-hosted and/or user-generated content program.

12. The system of claim 9, wherein each of the computational models of the set has been trained for recognizing a different one a plurality of people associated with the particular media content program, wherein the plurality includes at least the particular people.

13. The system of claim 9, wherein applying the face recognition program together with the set of computational models associated with the particular media content program to the digital image to recognize the one or more of the particular people in the digital image from among the one or more faces detected, together with respective geometric coordinates for each of the one or more detected faces in the digital image, comprises:
determining a feature vector corresponding to at least one of the one or more faces detected, together with respective geometric coordinates, in the digital image;
applying the face recognition program together with the set of computational models to the feature vector; and
determining that applying the face recognition program together with a particular model of the set of computational models to the feature vector yields a probability that both exceeds a threshold and is greater than probabilities yielded from applying the face recognition program together with any of the other computational models of the set.

14. The system of claim 13, wherein determining the feature vector corresponding to at least one of the one or more faces detected, together with respective geometric coordinates, in the digital image comprises:
applying a face detection program to the digital image to detect a spatial region of the digital image that includes the at least one of the one or more faces detected, together with respective geometric coordinates of the spatial region; and
applying a computer-implemented feature extraction program to the spatial region of the digital image to generate the feature vector.

15. The system of claim 9, wherein the operations further include:
receiving a further digital image associated with a further particular media content program, the further digital image containing one or more faces of further particular people associated with the further particular media content program;
applying the computer-implemented face recognition program together with a further set of computational models associated with the further particular media content program to the further digital image to recognize one or more of the further particular people in the further digital image from among one or more further faces detected, together with respective geometric coordinates for each of the one or more further detected faces in the further digital image, wherein each of at least a further subset of the further set of the computational models is additionally associated with a respective one of the further particular people; and
storing, in non-transitory computer-readable memory, the further digital image together with information (i) assigning respective identities of the recognized one or more of the further particular people in the further digital image, and (ii) associating with each respective assigned identity geometric coordinates in the further digital image of a further face to which the identity is assigned.

16. The system of claim 15, wherein the further digital image is different from the digital image,
wherein the further particular media content program is one of: different from the particular media content program, or the same as the particular media content program,
and wherein at least one of the recognized further particular people is one of: different from any of the recognized particular people, or the same as one of the recognized particular people.

17. A non-transitory computer-readable medium having instructions stored thereon that, when executed by one or more processors of a system, cause the system to carry out operations including:

receiving a digital image associated with a particular media content program, the digital image containing one or more faces of particular people associated with the particular media content program;

applying a face recognition program together with a set of computational models associated with the particular media content program to the digital image to recognize one or more of the particular people in the digital image from among one or more faces detected, together with respective geometric coordinates for each of the one or more detected faces in the digital image, wherein each of at least a subset of the set of the computational models is further associated with a respective one of the particular people; and storing, in non-transitory computer-readable memory, the digital image together with information (i) assigning respective identities of the recognized one or more of the particular people in the digital image, and (ii) associating with each respective assigned identity geometric coordinates in the digital image of a face to which the identity is assigned.

18. The non-transitory computer-readable medium of claim 17, wherein applying the face recognition program together with the set of computational models associated with the particular media content program to the digital image to recognize the one or more of the particular people in the digital image from among the one or more faces detected, together with respective geometric coordinates for each of the one or more detected faces in the digital image comprises:

determining a feature vector corresponding to at least one of the one or more faces detected, together with respective geometric coordinates, in the digital image;

applying the face recognition program together with the set of computational models to the feature vector; and determining that applying the face recognition program together with a particular model of the set of computational models to the feature vector yields a probability that both exceeds a threshold and is greater than probabilities yielded from applying the face recognition program together with any of the other computational models of the set.

19. The non-transitory computer-readable medium of claim 17, wherein at least one of the one or more of the particular people in the digital image is a cast member of the particular media content program.

20. The non-transitory computer-readable medium of claim 17, wherein the particular media content program is one of: a television program, a movie, a sporting event, or a web-based user-hosted and/or user-generated content program.

* * * * *